No. 694,321. Patented Feb. 25, 1902.
T. W. MORAN.
PIVOT JOINT FOR PIPES.
(Application filed Jan. 31, 1901.)

(No Model.) 3 Sheets—Sheet 1.

ATTEST-
George M. Anderson
Jos Gregory

INVENTOR-
T. W. Moran,
By
E W Anderson
his Att'y.

No. 694,321. Patented Feb. 25, 1902.
T. W. MORAN.
PIVOT JOINT FOR PIPES.
(Application filed Jan. 31, 1901.)

(No Model.) 3 Sheets—Sheet 3.

ATTEST.
George M. Anderson
Jos Gregory

INVENTOR.
T. W. Moran,
By E. W. Anderson
his Atty.

UNITED STATES PATENT OFFICE.

THOMAS WILLIAM MORAN, OF LOUISVILLE, KENTUCKY.

PIVOT-JOINT FOR PIPES.

SPECIFICATION forming part of Letters Patent No. 694,321, dated February 25, 1902.

Application filed January 31, 1901. Serial No. 45,457. (No model.)

*To all whom it may concern:*

Be it known that I, THOMAS WILLIAM MORAN, a citizen of the United States, and a resident of Louisville, in the county of Jefferson and State of Kentucky, have made a certain new and useful Invention in Pivot-Joints for Giving Flexibility to Hollow Pipes to Convey Steam, Air, Gas, or Liquid; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
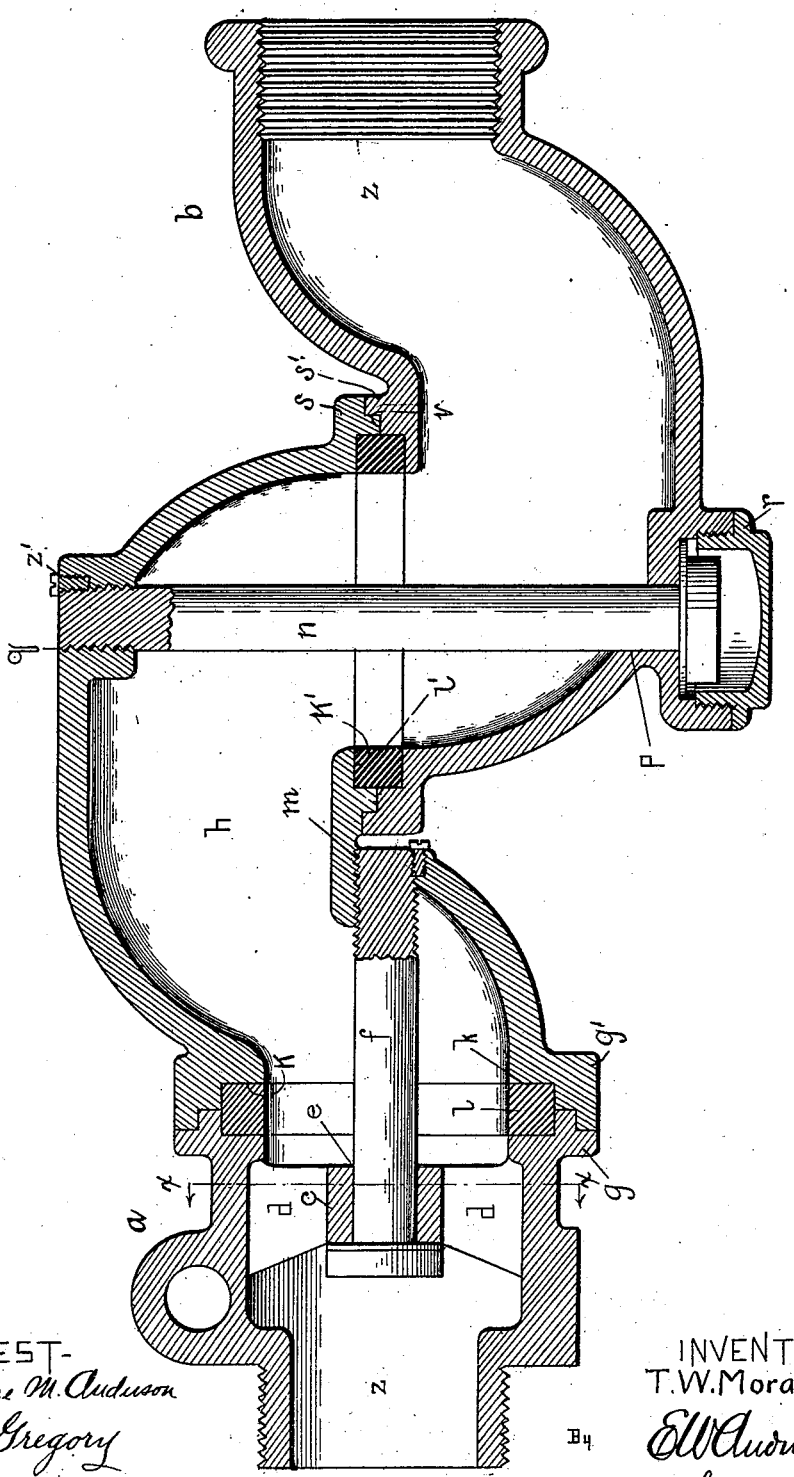
Figure 2:
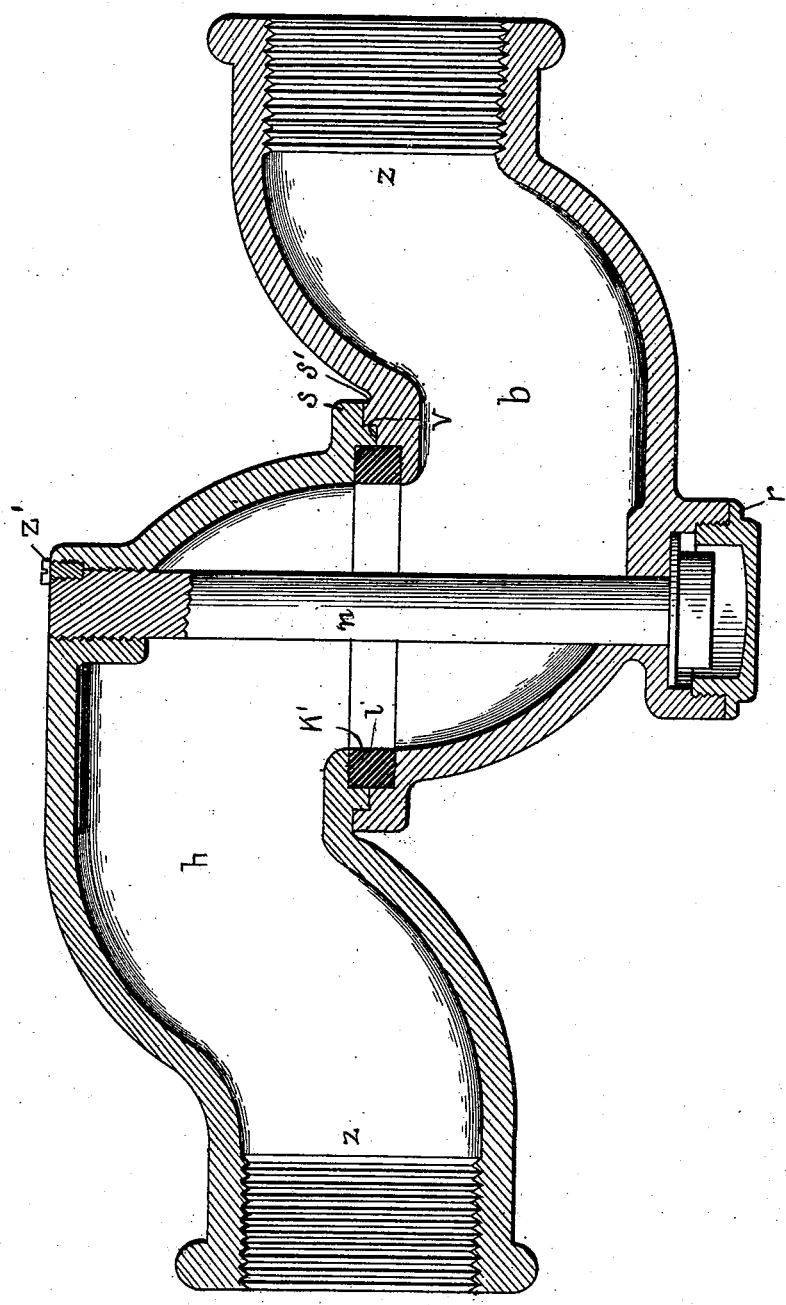
Figure 3:
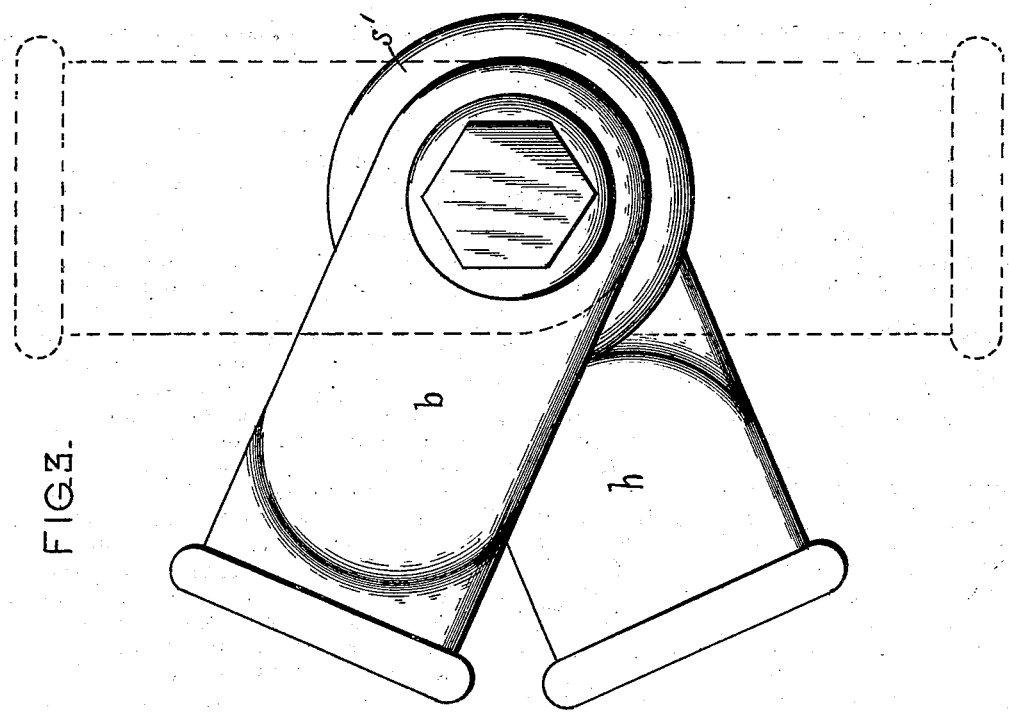
Figure 4:
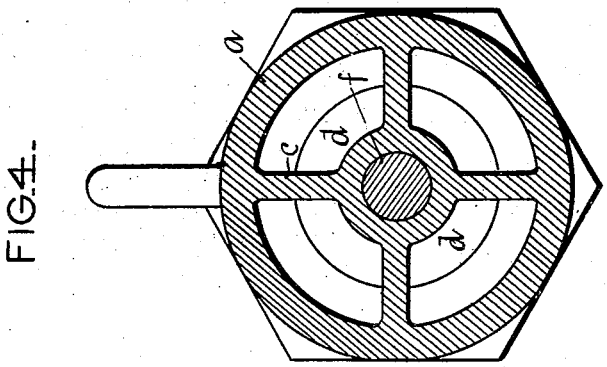

Figure 1 is a longitudinal central section of my joint, having the double pivotal or swivel connections. Fig. 2 is a similar view showing the single pivotal connection. Fig. 3 is a plan view of the joint shown in Fig. 2. Fig. 4 is a section on the line $x\ x$, Fig. 1.

The invention relates to pivot-joints for hollow pipes; and it consists in the novel construction and combinations of parts, as hereinafter set forth.

The object of the invention is to provide a hollow pipe-joint having vertical as well as horizontal motion of rotation in which the friction is materially reduced by swinging the parts from the inside or by means of concealed pivots.

In the accompanying drawings, the letter $a$ designates one of the ends or threaded attachment portions of the joint, and $b$ the other end or threaded attachment part, the threaded openings of these ends being on the same axial line. The part $a$ is formed with a spider-form diaphragm $c$, having openings $d$ for the passage of steam, air, liquid, or gas, according to the use to which the joint is applied. In the center of the diaphragm is an aperture $e$ for the passage of a bolt $f$, which is in the axial line between the two threaded openings $z\ z$. The inner annular face $a'$ of the end sections $a$ is formed with a circular bead or rib $g$, which engages a circular bead or rib $g'$ of the end face K of the middle section $h$ of the joint. Both of these contact-faces are rabbeted on the inside to form an annular chamber $k$ for the reception of a gasket $l$. The inner surface of this gasket is exposed to the pressure of the gas, air, or liquid or steam in the joint, and the pressure serves to hold the gasket closely against the crevice on its opposite side between the annular faces of the joint-sections. The end section $a$ is short and straight, the end section $b$ is semicircular, and the middle section $h$ is also semicircular.

The end section $a$ is connected to the middle section $h$ by the inside or concealed bolt $f$, which is in the axial line of the threaded openings of the joint and passes from the spider-diaphragm of the section $a$ to a threaded seat $m$ in the section $h$, said seat being located about the middle of the concave side of said section. The end section $b$ is connected to the middle section $h$ by a concealed transverse bolt $n$, which, passing through an aperture $p$ in the convex wall of one of said sections, has its end seated in a threaded aperture $q$ in the convex wall of the other section. The aperture $p$ is recessed to receive the outer end or head of the bolt $n$ and is closed in by means of a threaded cap $r$. The bolt $n$ is therefore at right angles to the bolt $f$. The annular contact-face K of the middle section $h$ extends around the bolt $f$, and the annular contact-face K' at the other end of the middle section has its plane at right angles to that of the face K and extends around the bolt $n$. The face K' is provided with an annular bead or rib $s$, which engages an annular rib $s'$ of the annular contact-face $v$ of the end section $b$. Each pivot-bolt is separated from the contact-face surrounding it by the radial distance of the pipe-opening, so that the throat of the joint is peripherally unobstructed. These faces K' and $v$ are rabbeted on the inside to provide an annular chamber or seat for a rubber gasket $l'$, the inner surface of which is exposed to pressure and the peripheral surface of which closes the crevice between the contact-faces.

This pipe-joint although designed to connect pipe-sections which lie in the same axial line has only two sets of contact-surfaces, which are at right angles to each other and are held in relative position by two bolts, also at right angles to each other. These bolts having inside or concealed pivots and in contact with the steam or other material passing through the joint are subject to but little friction, and that involved in the movements of the contact-faces is materially reduced by the positive character of the pivots, which ascertains the position of the contact-faces with great accuracy.

It is evident that this joint may be made in the double or single form, as may be required in the application. When the single form is made, the straight section *a* is not used, and the two semicircular sections have their end openings both threaded for attachment. When these openings are in line, their axis is at right angles to the transverse bolt which connects the sections, passing through the openings of their contact ends. These contact ends have their plane, therefore, at right angles to the pivot-bolt which is attached to their convex walls, and such plane, therefore, lies in the direction of the chords of their arcs. In order to secure the end of the pivot-bolt, a small screw may be used to lock it, as indicated at *z'*, and the bolt may then be formed with a head, under which a washer may be placed. If the small screw is made with the same number of threads to the inch as the large screw, the latter may be easily adjusted when the small screw is removed by turning it one or more rounds, and then replacing the locking-screw, which will work fair and lock the bolt.

Having described this invention, what I claim, and desire to secure by Letters Patent, is—

1. A hollow pivot-joint for pipe-sections, consisting of the two end sections having their outer end portions in alinement, and the middle section connected to said end sections by inside pivot-bolts at right angles to each other, substantially as specified.

2. A hollow pivot-joint for pipe-sections, consisting of the two end sections having their outer end portions adapted to be brought into alinement, and the middle section connected to said end sections by inside pivot-bolts at right angles to each other, said sections having annular contact-faces and gaskets having their outer peripheral walls spanning the joints thereof, substantially as specified.

3. In a hollow pivot-joint for pipes-sections, the pipe-sections having annular contact-faces, the gasket having its outer peripheral wall spanning the joint thereof, and its inner peripheral wall entirely exposed to pressure and the inside pivot-bolt connecting said sections, substantially as specified.

4. In a hollow pivot-joint for pipe-sections having annular contact-faces, the gasket having its outer peripheral wall spanning the joint of said faces, and the inside pivot-bolt having a threaded end portion engaging a threaded aperture of one of said sections, and a head engaging a shoulder of the other said section, substantially as specified.

5. In a pivotal pipe-joint, the combination with a semicircular middle section, a semicircular end section, and a straight end section, having their threaded ends in the same axial line, of inside pivot-bolts at right angles to each other, and exposed gaskets on the inside of the annular contact-faces, substantially as specified.

6. In a pivotal pipe-joint, the combination with the semicircular sections, having the plane of their contact-faces lying in the direction of the chords of their arcs, of the transverse concealed screw-bolt passing through the openings of their contact ends and connecting their convex walls, the annular recess in the joint, and the gasket in said recess, having its inner face exposed, substantially as specified.

In testimony whereof I affix my signature in presence of two witnesses.

THOMAS WILLIAM MORAN.

Witnesses:
E. E. SUTTON,
L. W. BOTTS.